(12) United States Patent
Kato

(10) Patent No.: US 11,543,001 B2
(45) Date of Patent: Jan. 3, 2023

(54) COATING METHOD AND MANUFACTURING METHOD FOR ANTI-VIBRATION RUBBER FOR VEHICLE

(71) Applicant: TOYO TIRE CORPORATION, Itami (JP)

(72) Inventor: Yuichi Kato, Itami (JP)

(73) Assignee: Toyo Tire Corporation, Itami (JP)

( * ) Notice: Subject to any disclaimer, the term of this patent is extended or adjusted under 35 U.S.C. 154(b) by 498 days.

(21) Appl. No.: 16/703,285

(22) Filed: Dec. 4, 2019

(65) Prior Publication Data

US 2020/0191236 A1 Jun. 18, 2020

(30) Foreign Application Priority Data

Dec. 13, 2018 (JP) .............................. JP2018-233217

(51) Int. Cl.
*F16F 15/08* (2006.01)
*F16F 1/36* (2006.01)

(52) U.S. Cl.
CPC ............... *F16F 15/08* (2013.01); *F16F 1/36* (2013.01)

(58) Field of Classification Search
CPC .. F16F 13/103; F16F 2226/02; F16F 2226/04; F16F 2230/0023; F16F 15/08; F16F 1/36
See application file for complete search history.

(56) References Cited

U.S. PATENT DOCUMENTS

| | | |
|---|---|---|
| 2006/0214341 A1 | 9/2006 | Sugiura et al. |
| 2009/0252879 A1 | 10/2009 | Yukawa et al. |
| 2013/0118649 A1* | 5/2013 | Hirata ....................... C21D 9/02 148/537 |
| 2020/0171930 A1* | 6/2020 | Yoshida ............... B60K 5/1225 |
| 2021/0140502 A1* | 5/2021 | Yamazaki ................. F16F 1/04 |

FOREIGN PATENT DOCUMENTS

| | | |
|---|---|---|
| CN | 101550308 A | 10/2009 |
| JP | 2001-271859 A | 10/2001 |
| JP | 2006-130384 A | 5/2006 |
| JP | 2006-266369 A | 10/2006 |
| JP | 2007-275720 A | 10/2007 |

OTHER PUBLICATIONS

Office Action dated Dec. 20, 2021, issued in counterpart CN application No. 201911250210.5, with English machine translation. (14 pages).
Office Action dated Aug. 9, 2022, issued in counterpart JP application No. 2018-233217, with the English machine translation. (6 pages).
Office Action dated Apr. 7, 2022, issued in counterpart CN application No. 201911250210.5, with English translation. (19 pages).
Shu-Mei Hyang, "Electromagnetic Metallurgy", Metallurgical Industry Press, Oct. 31, 2017, pp. 121, cited in CN Office Action dated Apr. 7, 2022. (3 pages).

* cited by examiner

*Primary Examiner* — Xuan Lan Nguyen
(74) *Attorney, Agent, or Firm* — WHDA, LLP

(57) ABSTRACT

A method for coating a liquid-sealed mount rubber includes: a paint application step of applying a water-based paint to an outer tube fitting appearing on an outer surface of a liquid-sealed mount rubber; and a paint drying step of heating the outer tube fitting by induction heating to dry the water-based paint applied to the outer tube fitting.

5 Claims, 5 Drawing Sheets

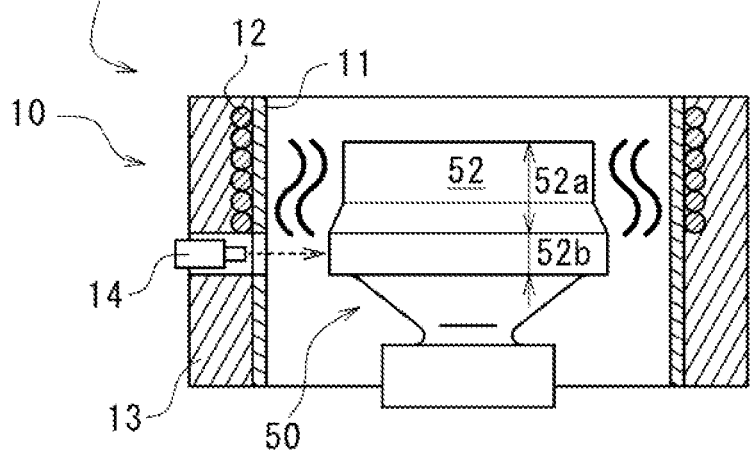
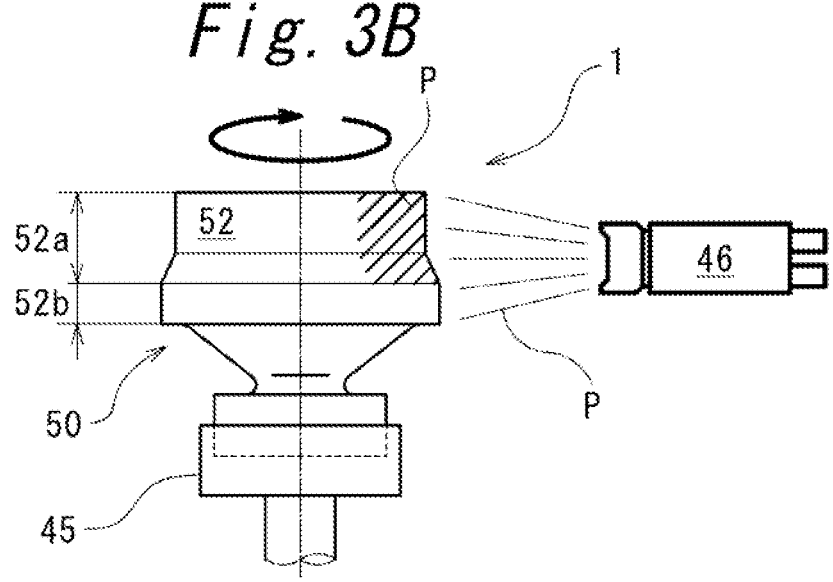
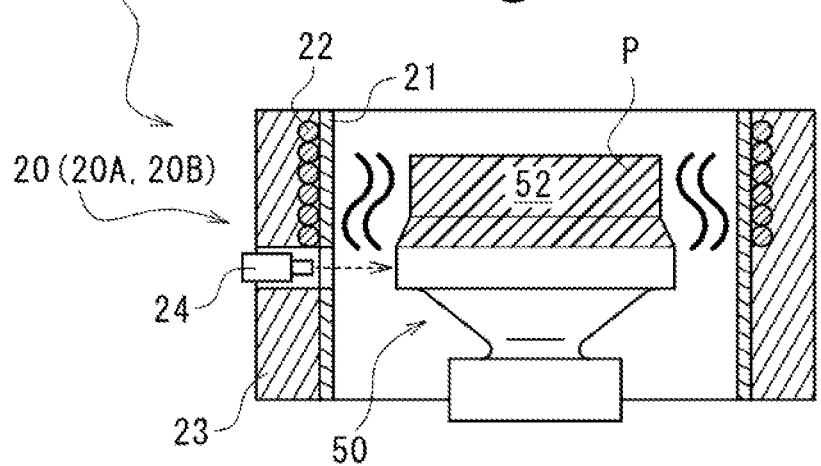

COATING METHOD AND MANUFACTURING METHOD FOR ANTI-VIBRATION RUBBER FOR VEHICLE

CROSS-REFERENCE TO RELATED APPLICATIONS

This application claims priority of Japanese Patent Application No. 2018-233217 filed on Dec. 13, 2018, the content of which is incorporated herein by reference.

BACKGROUND OF THE INVENTION

Technical Field

The present invention relates to a coating method and a manufacturing method for an anti-vibration rubber for vehicle.

Related Art

An anti-vibration rubber for vehicle (for example, liquid-sealed engine mount rubber or the like) is interposed between a vibration source and a support member that supports the vibration source, and is configured to elastically support the vibration source with respect to the support member. In general, the anti-vibration rubber for vehicle includes a metal attachment fitting, and is attached to the vibration source and the support member via the attachment fitting. For rust prevention, the attachment fitting may be coated by a coating device (for example, JP 2001-271859 A).

Conventionally, when rust prevention coating is performed on the attachment fitting of the anti-vibration rubber for vehicle, the coating method has included: first, heating the entire anti-vibration rubber for vehicle in a steam oven to preheat the temperature of the attachment fitting; next, applying organic solvent paint to the preheated attachment fitting; and lastly, heating the entire anti-vibration rubber for vehicle in a steam oven to dry the organic solvent paint applied to the attachment fitting.

JP 2001-271859 A discloses a method for preheating the attachment fitting including: heating the metal base material of the anti-vibration structure by induction heating to preheat the metal base material; and then pressure-bonding the anti-vibration rubber main body to the metal base material on the surface to be bonded to which the curable resin adhesive material is applied; and performing bonding and fixing.

SUMMARY

Heating by induction heating allows the attachment fitting made of metal among components of the anti-vibration rubber for vehicle to be efficiently heated and preheated. However, since the volatilized solvent of the organic solvent paint applied to the attachment fitting may ignite, induction heating cannot be adopted to dry the organic solvent paint applied to the attachment fitting.

In addition, when the paint applied to the attachment fitting is dried in a steam oven or the like as in the conventional method, since not only the attachment fitting but also the entire anti-vibration rubber for vehicle is heated, it takes energy and time. In addition, since the coated film is dried from the outer surface, as a result of shrinking when the interior cools down at the end, a crack or the like may occur on the surface side likely to dry first of the coated film.

Therefore, in a coating method for an anti-vibration rubber for vehicle, there is room for improving the coating method for an anti-vibration rubber for vehicle in a point of efficiently drying the paint applied to the attachment fitting while suppressing a crack or the like.

An object of the present invention is to provide a coating method and a manufacturing method for an anti-vibration rubber for vehicle that can efficiently dry paint applied to an attachment fitting included in the anti-vibration rubber for vehicle.

The present invention provides a method for coating an anti-vibration rubber for vehicle, the method including: a paint application step of applying a water-based paint to a metal fitting exposed to an outer surface of an anti-vibration rubber for vehicle; and a paint drying step of heating the metal fitting by induction heating to dry the water-based paint applied to the metal fitting.

According to the present invention, since a metal fitting of an anti-vibration rubber for vehicle can be raised to a desired temperature in a short time by induction heating, the metal fitting can be heated efficiently as compared with the heating of the entire anti-vibration rubber for vehicle. Furthermore, since the water-based paint applied to the metal fitting can be dried from the metal fitting side (inner surface side) in the thickness direction of the coated film, it is easy to efficiently dry the coated film while suppressing cracks or the like as compared with drying the coated film from the surface side. In addition, adopting the water-based paint as the paint makes it possible to prevent the paint from being ignited when induction heating is used as the heating means.

Preferably, the method further includes a preheating step of heating and preheating the metal fitting by induction heating prior to application of the water-based paint.

According to the present configuration, since a metal fitting of an anti-vibration rubber for vehicle can be raised to a desired temperature in a short time by induction heating, the metal fitting can be preheated efficiently as compared with the heating of the entire anti-vibration rubber for vehicle.

In addition, preferably, a preheating temperature of the metal fitting in the preheating step and a drying temperature of the metal fitting in the paint drying step are lower than a boiling point of the water-based paint, and the preheating temperature is higher than the drying temperature.

According to the present configuration, since boiling of the water-based paint to be applied to the metal fitting is suppressed, a dense coated film without swelling, cracking, or the like can be formed on the surface of the metal fitting. In addition, since the metal fitting heated to the preheating temperature is lowered in temperature by the heat of vaporization of the paint when the water-based paint is applied, for example, by the spray, the preheating temperature can be set higher than the drying temperature. Thus, the water-based paint can be applied to the metal fitting in a higher temperature state while boiling is suppressed, so that drying of the water-based paint applied to the metal fitting can be facilitated.

In addition, preferably, the method further includes, when heating the metal fitting by the induction heating, measuring a temperature of a non-coated portion not coated of the metal fittings, and monitoring whether a temperature of the metal fitting exceeds a predetermined upper limit value.

According to the present configuration, measuring the temperature of the non-coated portion of the metal fitting makes it possible to exclude the influence of variations or the like in surface properties of a non-measurement portion and to accurately and stably monitor that the temperature of the metal fitting is raised to a desired temperature. For example, it is easy to detect that the metal fitting is abnormally raised in temperature by induction heating, and the water-based paint can be prevented from being overheated.

In addition, preferably, a time of the preheating step, a time of the paint application step, and a time of the paint drying step are set substantially identical.

According to the present configuration, since the anti-vibration mount for vehicle can be conveyed one by one to the preheating step, the paint application step, and the paint drying step in order at a constant-length feed, the anti-vibration mount for vehicle can be coated efficiently.

In addition, another aspect of the present invention provides a method for manufacturing an anti-vibration rubber for vehicle including the method for coating an anti-vibration rubber for vehicle described in any one of the above.

According to the present invention, the paint applied to an attachment fitting included in the anti-vibration rubber for vehicle can be efficiently dried.

BRIEF DESCRIPTION OF THE DRAWINGS

The foregoing and the other features of the present invention will become apparent from the following description and drawings of an illustrative embodiment of the invention in which:

FIGS. 3A to 3C are explanatory views showing a coating process of an anti-vibration rubber for vehicle.

DETAILED DESCRIPTION OF EMBODIMENTS

Hereinafter, an embodiment according to the present invention will be described with reference to the accompanying drawings. Note that the following description is substantially a mere example and is not intended to limit the present invention, applicable objects thereof, and use thereof. Furthermore, the drawings are schematic, and the ratio among dimensions is different from the actual ones.

Figure 1:
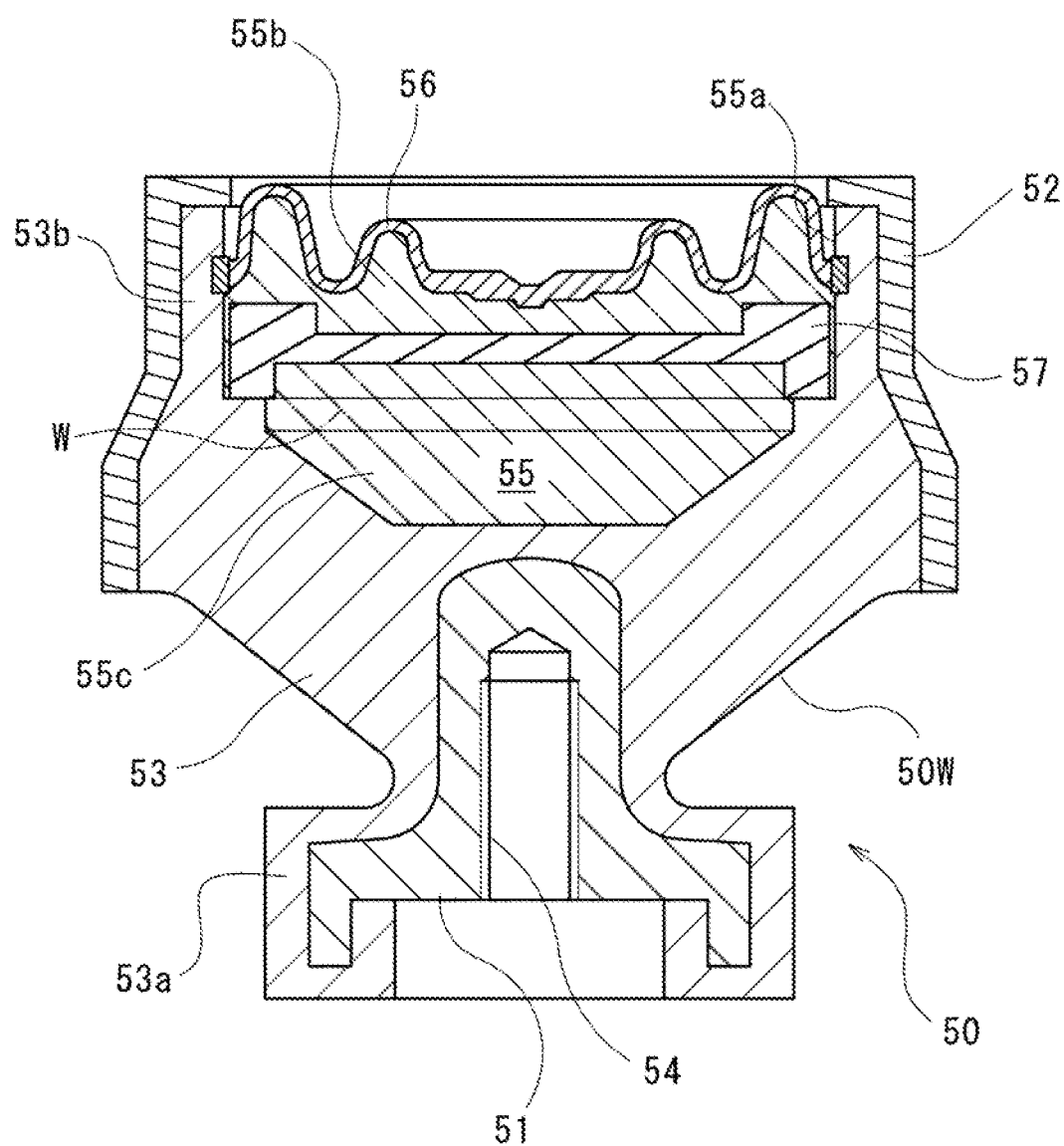
FIG. 1 is a longitudinal sectional view of an anti-vibration rubber for vehicle.

FIG. 1 shows a liquid-sealed engine mount rubber 50 (hereinafter referred to as "a liquid-sealed mount rubber 50") as an example of an anti-vibration rubber for vehicle. The liquid-sealed mount rubber 50 is interposed between an engine and a vehicle body frame (that are not shown), and elastically supports the engine with respect to the vehicle body frame, and includes a boss fitting 51 to be attached to the engine, an outer tube fitting 52 to be attached to the vehicle body frame, and an elastic base body 53 made of a rubber member interposed between the boss fitting 51 and the outer tube fitting 52.

The boss fitting 51 is provided with a female threaded portion 54 extending in the vertical direction, and is configured to be attached to a member on the engine side by a bolt (not shown). The outer tube fitting 52 is a metal cylindrical member, is exposed to the outer surface of the liquid-sealed mount rubber 50, and is to be attached to the vehicle body frame.

In the elastic base body 53, the boss fitting 51 is vulcanization-bonded to a lower end portion 53a, and the outer tube fitting 52 is fixed to an upper end portion 53b by caulking. The upper end portion 53b has an outer diameter larger than that of the lower end portion 53a, and a liquid chamber 55 opened upward is defined inside the upper end portion 53b. The opening 55a at the upper end of the liquid chamber 55 is provided with a diaphragm 56.

The liquid chamber 55 is hermetically sealed by the diaphragm 56, so that liquid such as water, ethylene glycol, or silicone oil is sealed in the liquid chamber 55. The liquid chamber 55 is vertically partitioned by a partition member 57 into an upper first chamber 55b and a lower second chamber 55c, and these communicate with each other through an orifice flow passage (not shown) formed in the partition member 57. Thus, the liquid sealed in the liquid chamber 55 is configured to be able to flow between the first chamber 55b and the second chamber 55c.

Figure 2A:
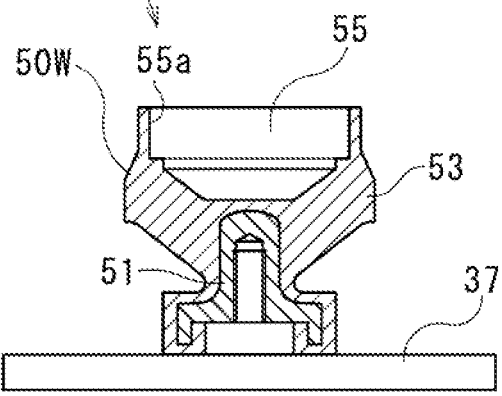
FIGS. 2A to 2F are explanatory views showing an assembly process of an anti-vibration rubber for vehicle.

Next, a manufacturing method for manufacturing the liquid-sealed mount rubber 50 will be described. First, an assembly process of the liquid-sealed mount rubber 50 will be described with reference to FIGS. 2A to 2F. In the mount workpiece placing step 31 shown in FIG. 2A, a mount workpiece 50W obtained by vulcanizing the boss fitting 51 to the elastic base body 53 is prepared, and the mount workpiece 50W is placed on the assembly table 37 in such an attitude that the opening 55a of the liquid chamber 55 is opened upward.

Figure 2B:
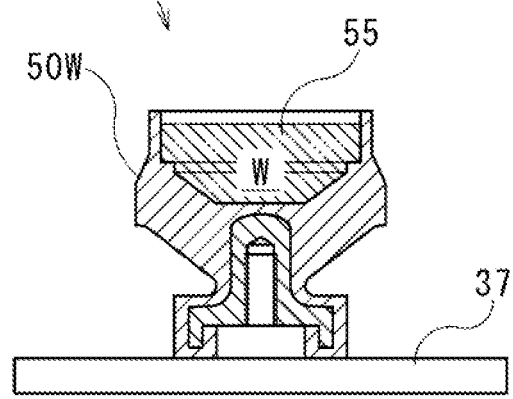
Figure 2C:
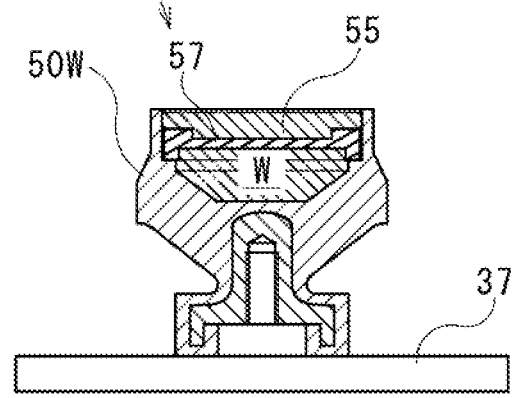
Figure 2D:
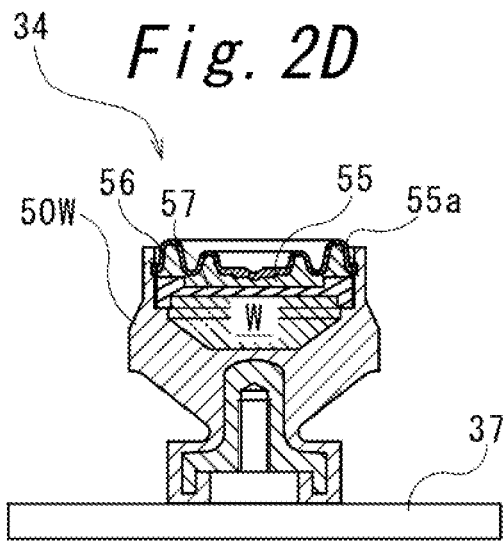

Next, in the liquid putting step 32 shown in FIG. 2B, a predetermined amount of liquid W is put into the liquid chamber 55. Then, in the partition member mounting step 33 shown in FIG. 2C, the partition member 57 is mounted into the liquid chamber 55. Furthermore, in the diaphragm mounting step 34 shown in FIG. 2D, the diaphragm 56 is assembled to the opening 55a of the liquid chamber 55.

Figure 2E:
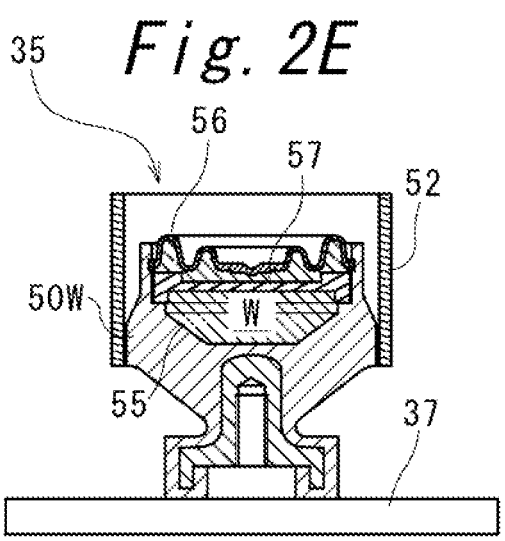
Figure 2F:
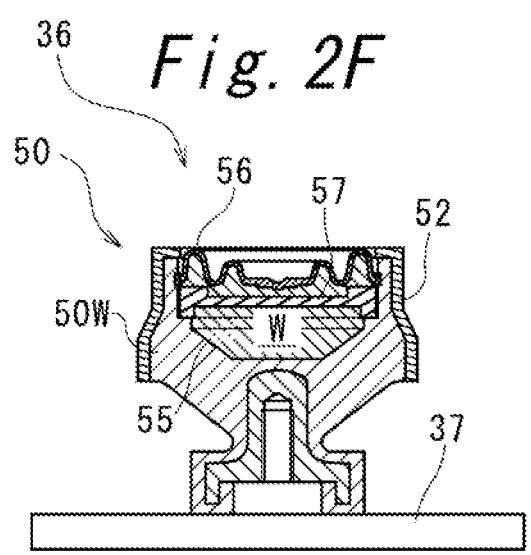

Next, in the outer-tube-fitting mounting step 35 shown in FIG. 2E, the outer tube fitting 52 is inserted into the outer periphery of the upper end portion of the mount workpiece 50W. Lastly, in the liquid-chamber sealing step 36 shown in FIG. 2F, caulking the outer tube fitting 52 inward in the radial direction to fix the diaphragm 56 to the opening 55a of the liquid chamber 55 seals the liquid W in the liquid chamber 55. Thus, the liquid-sealed mount rubber 50 is assembled.

Next, a coating method for coating the outer surface of the outer tube fitting 52 of the liquid-sealed mount rubber 50 will be described with reference to FIGS. 3A to 3C. The outer tube fitting 52 is coated with a water-based paint P, not an organic solvent paint. In the present invention, the water-based paint P is a term compared with an organic solvent paint, and in general, means a paint in which a coated film forming resin, a pigment, and the like are dispersed and/or dissolved in water or a medium mainly containing water (aqueous medium). In addition, the water-based paint P contains a component excellent in rust prevention performance, and is a rust preventive water-based paint. Applying the water-based paint P to the outer tube fitting 52 improves the rust prevention performance of the outer tube fitting 52. The boiling point of the water-based paint P is 100 degrees or less.

Note that in the liquid-sealed mount rubber 50, the range of approximately ⅔ of the outer tube fitting 52 positioned on the upper side is configured as a coated portion 52a to be coated, and the remaining range of approximately ⅓ positioned on the lower side is configured as a non-coated portion 52b not to be painted. In the present embodiment, the coated portion 52a corresponds to a portion caulked radially inward of the outer tube fitting 52.

First, in the preheating step 41 shown in FIG. 3A, the outer tube fitting 52 of the liquid-sealed mount rubber 50 is preheated by the preheating device 10 prior to application of the water-based paint P. Preheating the outer tube fitting 52 allows the drying of the water-based paint P applied to the outer tube fitting 52 in the subsequent paint application step 42 to be accelerated. The preheating temperature is set to a temperature at which the surface temperature of the outer tube fitting 52 does not boil the water-based paint P when the water-based paint P is applied, and is set to, for example, 80 degrees or more and 90 degrees or less.

The preheating device 10 heats the outer tube fitting 52 by electromagnetic induction heating. Specifically, the preheating device 10 includes: a cylindrical coil pipe 11 extending in the vertical direction; a coil 12 wound around the outer peripheral portion of the coil pipe 11; a holding member 13 for holding the coil pipe 11 and the coil 12 from the outer peripheral side; and a temperature measuring instrument 14, provided in the holding member 13, for measuring the surface temperature of the outer tube fitting 52.

The coil pipe 11 is a resin member, and an outer tube fitting 52 made of a magnetic material (for example, a steel material) is arranged as a heated member that is heated radially inward by induction heating. In addition, the resin coil pipe 11 prevents the heated member from coming into direct contact with the coil 12.

The coil 12 is a conducting wire (for example, made of copper), and an AC power source (not shown) is connected to both ends. Due to the magnetic field generated by flowing a high-frequency current from the AC power source through the coil 12, an eddy current flows through the heated member disposed inside the coil pipe 11 to generate heat. The coil 12 is provided at a height position corresponding to the coated portion 52a of the outer tube fitting 52.

The temperature measuring instrument 14 is a non-contact thermometer, and a radiation thermometer is adopted in the present embodiment. The radiation thermometer measures the temperature of an object to be measured by measuring the intensity of thermal radiation such as infrared rays and visible rays radiated from an object. Note that the thermal radiation to be radiated may differ depending on surface properties of the object to be measured. The temperature measuring instrument 14 passes through the coil pipe 11 and the holding member 13 in the radial direction below the coil 12, is positioned at a height corresponding to the non-coated portion 52b of the outer tube fitting 52, and measures the surface temperature of the non-coated portion 52b.

The temperature measuring instrument 14 monitors whether the temperature of the portion to be measured exceeds a predetermined upper limit value. In the present embodiment, the temperature measuring instrument 14 monitors whether the surface temperature of the outer tube fitting 52 of the liquid-sealed mount rubber 50 exceeds 100 degrees.

In addition, air is supplied to the holding member 13 from a cooling fan (not shown), so that the coil pipe 11 and the coil 12 are cooled.

Next, in the paint application step 42 shown in FIG. 3B, a coating device 1 including a mount support unit 45 for supporting the liquid-sealed mount rubber 50, and a coating spray 46 is provided. The mount support unit 45 supports the liquid-sealed mount rubber 50 from below in such an attitude that the outer tube fitting 52 is positioned upward with the longitudinal direction of the liquid-sealed mount rubber 50 directed toward the vertical direction, and is configured to rotate around the central axis extending in the longitudinal direction of the liquid-sealed mount rubber 50.

The coating spray 46 sprays and applies the water-based paint P to the coated portion 52a of the outer tube fitting 52 of the liquid-sealed mount rubber 50 supported and rotated by the mount support unit 45.

Lastly, in the paint drying step 43 shown in FIG. 3C, in the liquid-sealed mount rubber 50, the outer tube fitting 52 is heated in the drying device 20, and the drying of the water-based paint P is facilitated. Thus, the liquid-sealed mount rubber 50 is manufactured.

Similarly to the preheating device 10, the drying device 20 heats and dries the heated member by electromagnetic induction heating. As with the preheating device 10, the drying device 20 includes a cylindrical coil pipe 21, a coil 22, a holding member 23, and a temperature measuring instrument 24, and since each of them is the same as that of the preheating device 10, a detailed description thereof will be omitted. Note that, the drying temperature in the drying device 20 is set to a temperature at which the water-based paint P applied to the outer tube fitting 52 does not boil, and is set to be lower than the preheating temperature, for example, 70 degrees or more and 80 degrees or less.

FIGS. 4A to 4D show the flow of the liquid-sealed mount rubber 50 in the coating line 2 in which the respective steps 41 to 43 of the coating step 40 are performed. The coating line 2 includes a conveyor 3 on which the liquid-sealed mount rubber 50 is conveyed from left to right in FIGS. 4A to 4D. On the conveyor 3, a preheating device 10, a coating device 1, and a drying device 20 are arranged in this order from the upstream side in the conveyance direction.

In the present embodiment, in order to make the cycle time of each step substantially equal, the paint drying step 43, which takes time compared to the other steps, is divided into two, the first paint drying step 43A and the second paint drying step 43B, and the drying device 20 includes a first drying device 20A positioned on the upstream side in the conveyance direction and a second drying device 20B positioned on the downstream side, which respectively correspond to the steps. The liquid-sealed mount rubber 50 is conveyed to the preheating device 10, the coating device 1, and the first and second drying devices 20A and 20B at a constant-length feed and positioned in each device; and the preheating step 41, the paint application step 42, and the paint drying step 43 are performed simultaneously.

Thus, the preheating step 41, the paint application step 42, and the first and second paint drying steps 43A and 43B are performed with substantially the same cycle time, so that the liquid-sealed mount rubber 50 can be conveyed at a constant-length feed while the occurrence of waiting time in each step is suppressed, and the liquid-sealed mount rubber 50 can be coated efficiently.

In addition, the preheating device 10, the coating device 1, and the first and second drying devices 20A and 20B are configured to be movable up and down in the vertical direction, each step is performed at the lowered position, and the liquid-sealed mount rubber 50 is conveyed to the next step at the position retracted upward.

Figure 4A:
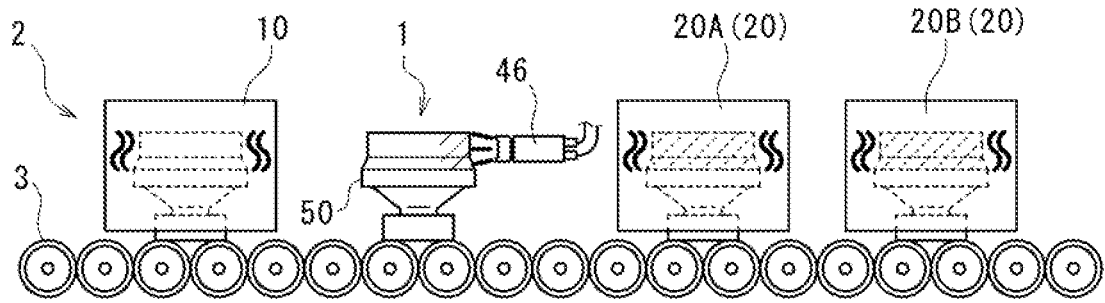
FIGS. 4A to 4D are explanatory views showing a flow of a liquid-sealed mount rubber in a coating line.

FIG. 4A shows a situation in which the preheating device 10, the coating device 1, and the first and second drying devices 20A and 20B are lowered, and the respective steps 41 to 43 are performed. At this time, in the preheating device 10, the outer tube fitting 52 of the liquid-sealed mount rubber 50 is heated by induction heating and is heated to a preheating temperature of 80 degrees or more and 90 degrees or less. At this time, the temperature measuring instrument 14 monitors the surface temperature of the outer tube fitting 52 and detects a temperature abnormality (for example, abnormal temperature rise).

In addition, in the coating device 1, the water-based paint P is sprayed and applied to the coated portion 52a of the preheated outer tube fitting 52 by the coating spray 46. At this time, the outer tube fitting 52 is preheated to a preheating temperature of 80 degrees or more and 90 degrees or less, but the temperature is reduced to about 50 degrees to 60 degrees by the heat of vaporization due to the spray of the water-based paint P.

Next, in the first and second drying devices 20A and 20B, the liquid-sealed mount rubber 50 is heated to a drying temperature of 70 degrees or more and 80 degrees or less due to the outer tube fitting 52 heated by induction heating. At this time, the surface temperature of the outer tube fitting 52 is monitored by the temperature measuring instrument 24, and a temperature abnormality is to be detected. Note that the temperature measuring instrument 24 measures the surface temperature of the non-coated portion 52b of the outer tube fitting 52. Since the non-coated portion 52b is not formed with a coated film and has no change in surface properties, the temperature of the outer tube fitting 52 can be accurately and stably measured by the temperature measuring instrument 24 being a radiation thermometer.

Considering that the temperature decreases due to heat of vaporization in the subsequent paint application step 42, the temperature is set to 80 degrees or more and 90 degrees or less in a range of preventing the water-based paint P from being boiled at the time of preheating. On the other hand, at the time of drying, the temperature is set to lower than the preheating temperature, that is, to 70 degrees or more and 80 degrees or less so that the water-based paint P does not boil even considering the rapid temperature rise by induction heating in the paint drying step 43.

Figure 4B:
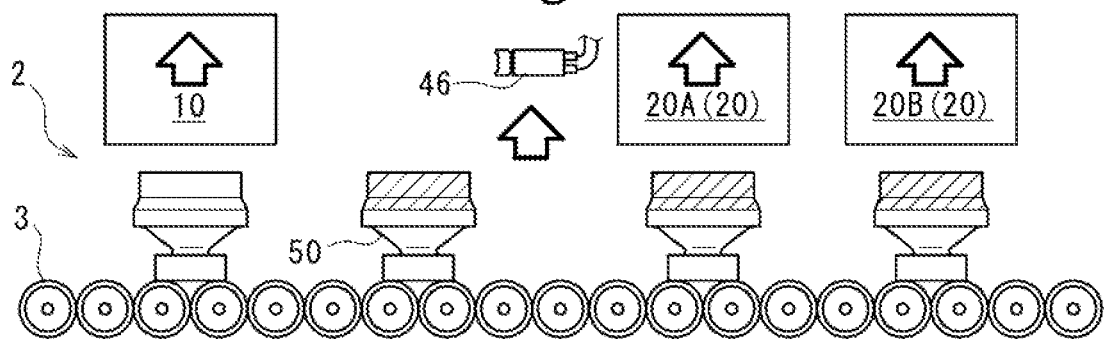
Figure 4C:
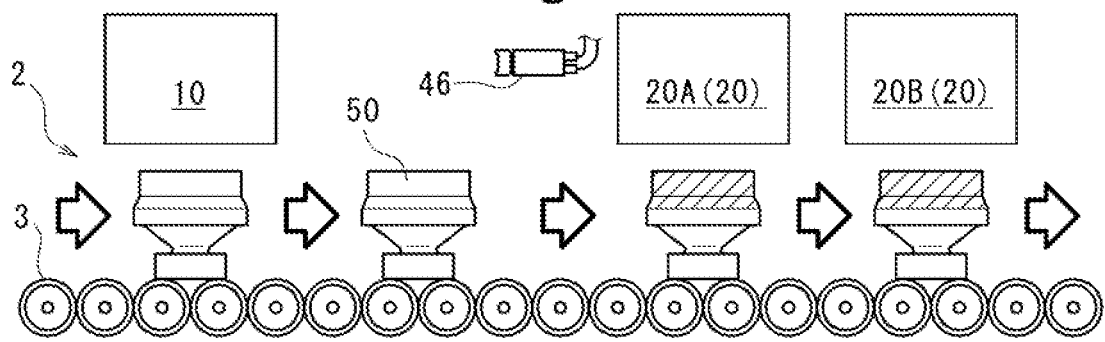
Figure 4D:
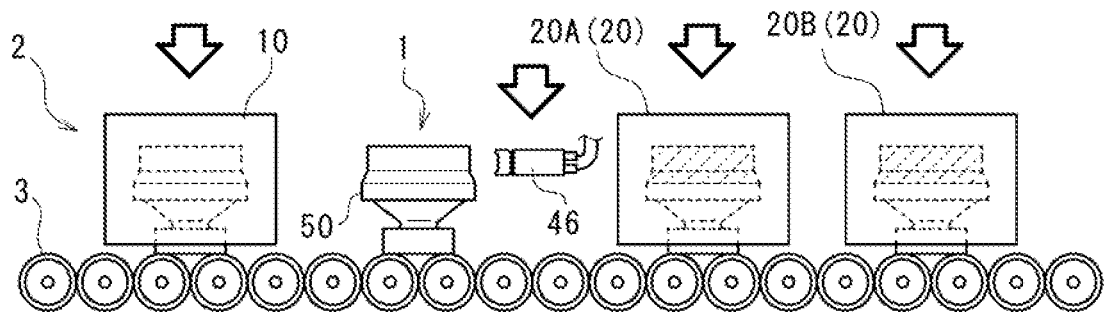

If each of the steps 41 to 43 is completed, as shown in FIG. 4B, the preheating device 10, the coating device 1, the first and second drying devices 20A and 20B are retracted upward. Next, as shown in FIG. 4C, the liquid-sealed mount rubber 50 positioned in each of the steps 41 to 43 is conveyed to the next step on the downstream side in the conveyance direction at a constant-length feed by the conveyor 3. Next, as shown in FIG. 4D, the preheating device 10, the coating device 1, the first and second drying devices 20A and 20B are lowered. Thereafter, a series of flows shown in FIGS. 4A to 4D is repeated.

According to the coating method for the liquid-sealed mount rubber 50 described above, the following effects can be obtained.

(1) In the paint drying step 43, since the outer tube fitting 52 of the liquid-sealed mount rubber 50 can be raised to a desired temperature in a short time by induction heating, the outer tube fitting 52 can be heated efficiently as compared with the heating of the entire liquid-sealed mount rubber 50. Furthermore, the water-based paint P applied here is dried by the outer tube fitting 52 raised in temperature by induction heating. That is, since the water-based paint P can be dried from the outer tube fitting 52 side (inner surface side) in the thickness direction of the coated film, it is easy to dry the coated film while suppressing cracks or the like as compared with drying the coated film from the surface side of the coated film.

In addition, adopting the water-based paint P as the paint makes it possible to prevent the paint from being ignited when induction heating is used as the heating means.

(2) In addition, adopting induction heating also in the preheating step 41 allows the outer tube fitting 52 of the liquid-sealed mount rubber 50 to be raised in temperature to a desired temperature in a short time, so that the outer tube fitting 52 can be efficiently preheated as compared with the case of heating the entire liquid-sealed mount rubber 50.

(3) Since the preheating temperature and the drying temperature are set to a temperature at which the water-based paint P does not boil, boiling of the water-based paint to be applied to the metal fitting is suppressed, and a dense coated film without swelling, cracking, or the like can be formed on the surface of the metal fitting.

In addition, the preheating temperature is higher than the drying temperature, and since the outer tube fitting 52 heated to the preheating temperature is lowered in temperature by the heat of vaporization of the water-based paint P when the water-based paint P is applied by the coating spray 46, the preheating temperature can be set higher than the drying temperature. Thus, the water-based paint P can be applied to the outer tube fitting 52 in a higher temperature state while boiling is suppressed, so that drying of the water-based paint P applied to the outer tube fitting 52 can be facilitated.

(4) Measuring the temperature of the non-coated portion 52b of the outer tube fitting 52 makes it possible to exclude the influence of changes in surface properties as in the coated portion 52a and to accurately and stably monitor that the temperature of the outer tube fitting 52 is raised to a desired temperature. For example, it is easy to detect that the outer tube fitting 52 is abnormally raised in temperature by induction heating, and the water-based paint P can be prevented from being overheated.

(5) In the coating line 2, since each of the preheating step 41, the paint application step 42, and the first and second paint drying steps 43A and 43B is set with substantially the same cycle time, the liquid-sealed mount rubber 50 can be conveyed sequentially one by one to each of the preheating step 41, the paint application step 42, and the first and second paint drying steps 43A and 43B at a constant-length feed. Thus, the liquid-sealed mount rubber 50 can be efficiently coated.

In the above embodiment, the liquid-sealed mount rubber is described as an example, but the present invention is not limited to this. That is, the present invention can be applied to a case where a metal fitting exposed to the outer surface of a mount member that elastically supports one member with respect to the other member is coated. The present invention can be applied to an anti-vibration rubber for vehicle, and for example, besides to an engine mount, the present invention can also be applied to a body mount interposed between the vehicle body frame and the body, and to a transmission mount interposed between the transmission and the vehicle body frame. In addition, the present invention can also be applied to a total rubber type mount member (however, including an attachment fitting) in which a liquid chamber is not formed, and therefore, liquid is not sealed in.

Note that the present invention is not limited to the configuration described in the above embodiment, and various modifications are possible.

What is claimed is:

1. A method for coating an anti-vibration rubber for vehicle, the method comprising:
   a paint application step of applying a water-based paint to a metal fitting exposed to an outer surface of an anti-vibration rubber for vehicle; and
   a paint drying step of heating the metal fitting by electromagnetic induction heating to dry the water-based paint applied to the metal fitting,
   wherein when heating the metal fitting by the electromagnetic induction heating,
   measuring a temperature of a non-coated portion not coated of the metal fittings, and
   monitoring whether a temperature of the metal fitting exceeds a predetermined upper limit value.

2. The method for coating an anti-vibration rubber for vehicle according to claim 1, further comprising a preheating step of heating and preheating the metal fitting by induction heating prior to application of the water-based paint.

3. The method for coating an anti-vibration rubber for vehicle according to claim 2,
wherein a preheating temperature of the metal fitting in the preheating step and a drying temperature of the metal fitting in the paint drying step are lower than a boiling point of the water-based paint, and
wherein the preheating temperature is higher than the drying temperature.

4. The method for coating an anti-vibration rubber for vehicle according to claim 2, wherein a time of the preheating step, a time of the paint application step, and a time of the paint drying step are set substantially identical.

5. A method for manufacturing an anti-vibration rubber for vehicle, the method comprising a step of coating an anti-vibration rubber for vehicle by the method for coating an anti-vibration rubber for vehicle according to claim 1.

* * * * *